No. 720,655. PATENTED FEB. 17, 1903.
G. F. BARD.
JOINT FOR PIPE COUPLINGS.
APPLICATION FILED MAR. 3, 1902.
NO MODEL.
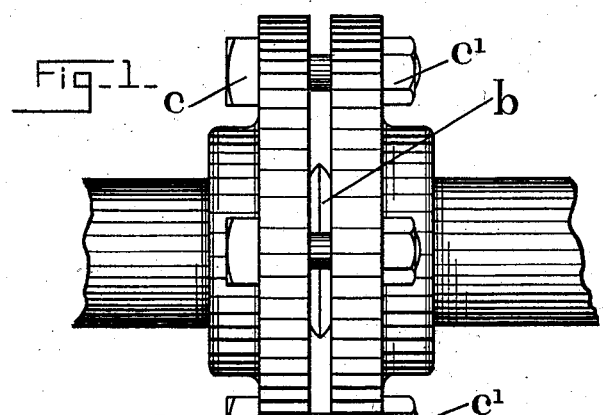
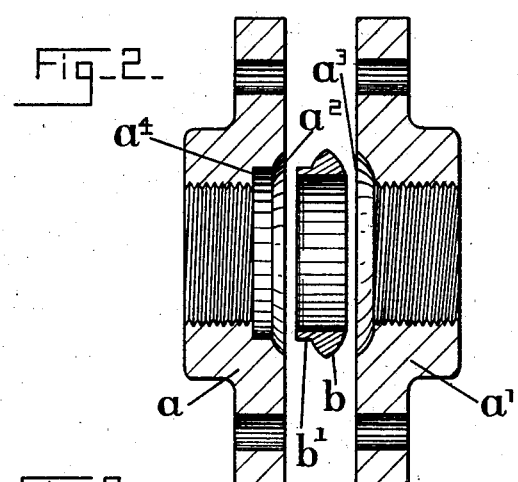
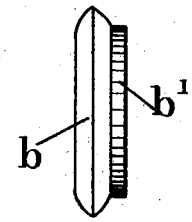
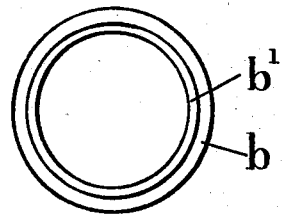
Witnesses
Frank S. Dewire
May F. Ritchie
George F. Bard, Inventor,
by Frank H. Allen
Attorney.

UNITED STATES PATENT OFFICE.

GEORGE F. BARD, OF NORWICH, CONNECTICUT.

JOINT FOR PIPE-COUPLINGS.

SPECIFICATION forming part of Letters Patent No. 720,655, dated February 17, 1903.

Application filed March 3, 1902. Serial No. 96,365. (No model.)

*To all whom it may concern:*

Be it known that I, GEORGE F. BARD, a citizen of the United States, residing at Norwich, in the county of New London and State of Connecticut, have invented certain new and useful Improvements in Joints for Pipe-Couplings, of which the following is a full, clear, and exact description.

My invention is in so-called "unions" or couplings for the meeting ends of pipes in which water or steam is maintained under pressure; and my object is to provide a very simple and cheap ground joint that will readily withstand extraordinary pressure.

Briefly described, my new device consists of a metallic washer of ring form having an annular extension that is adapted to lie within the counterbored end of one member of the union, said annulus being located inside of the ground joint formed by the washer proper and the abutting portions of the two principal members of the union—that is to say, the two flanges into which the pipe ends are screwed.

My invention is equally applicable to flange-unions or ordinary couplings; but I have illustrated it here as applied to a simple form of flange-union, Figure 1 being a side or edge view of such a union. Fig. 2 is a central longitudinal view of such a union and of my improved washer, the several elements being separated in order that the details of construction may be readily understood. In Figs. 3 and 4 I have shown side and end views of my said washer detached.

In the drawings the letters $a$ $a'$ indicate the two flanges of the union, each flange being threaded internally, as seen in Fig. 2, to receive the meeting ends of two pipe-sections. The confronting faces of said flanges are cupped, as at $a^2$ $a^3$, to receive a washer $b$, whose opposite sides are shaped to fit the said cupped portions of the flanges, the said washer being preferably made of brass, phosphor-bronze, or other metal that is practically non-corrosive when used with iron flanges. One end of the inner wall of the washer $b$ is extended to provide an annular flange $b'$, which when the several parts of the union are assembled lies in a corresponding recess $a^4$, that is formed by counterboring the flange $a$ at the base of its cupped portion $a^2$. It is not intended or necessary that the annulus $b'$ shall fit tightly in the recess $a^4$, but rather that it shall be so fitted that the washer $b$ may be readily removed from the flange without the aid of tools, it being desirable that the washer be thus removed while the flange is being screwed onto the pipe end in order that the washer may not be jammed or otherwise mutilated. The annulus $b'$ when seated in the recess $a^4$ serves to retain the washer in proper relation to the cupped portions $a^2$ $a^3$ of the flanges and to prevent the deflection or disarrangement of the said washer when the flanges are being clamped together, which is ordinarily accomplished by means of bolts $c$ and nuts $c'$, as seen in Fig. 1 of the drawings.

I desire to call particular attention to the important fact that the annulus $b'$ (by means of which the washer is retained in its operative position) is located entirely inside of the joint provided by the washer and the coacting cupped portion $a^2$ and so that steam or water passing into the recess $a^4$ and surrounding the annulus cannot escape.

My described invention provides an exceedingly simple and effective joint, and it may be readily and cheaply applied to unions and couplings as now commonly constructed.

Having thus described my invention, I claim—

In combination, with one member of a pipe-coupling having a cupped face $a^3$, a companion member having its face cupped as at $a^2$ and formed with an annular recess $a^4$ as set forth, and a washer interposed between said members and formed with an annular flange adapted to engage the said recess $a^4$; the said flange and coacting recess being located within the joint formed by the abutting faces of the washer with the cupped portions of the said members.

Signed at Norwich, Connecticut, this 27th day of February, 1902.

GEORGE F. BARD.

Witnesses:
CHAS. TYLER BARD,
FRANK H. ALLEN.